Feb. 18, 1964       M. L. ANTHONY       3,121,340
RESILIENT NUT FOR AVERAGING OUT LEAD SCREW ERROR
Filed Jan. 3, 1961       2 Sheets-Sheet 1
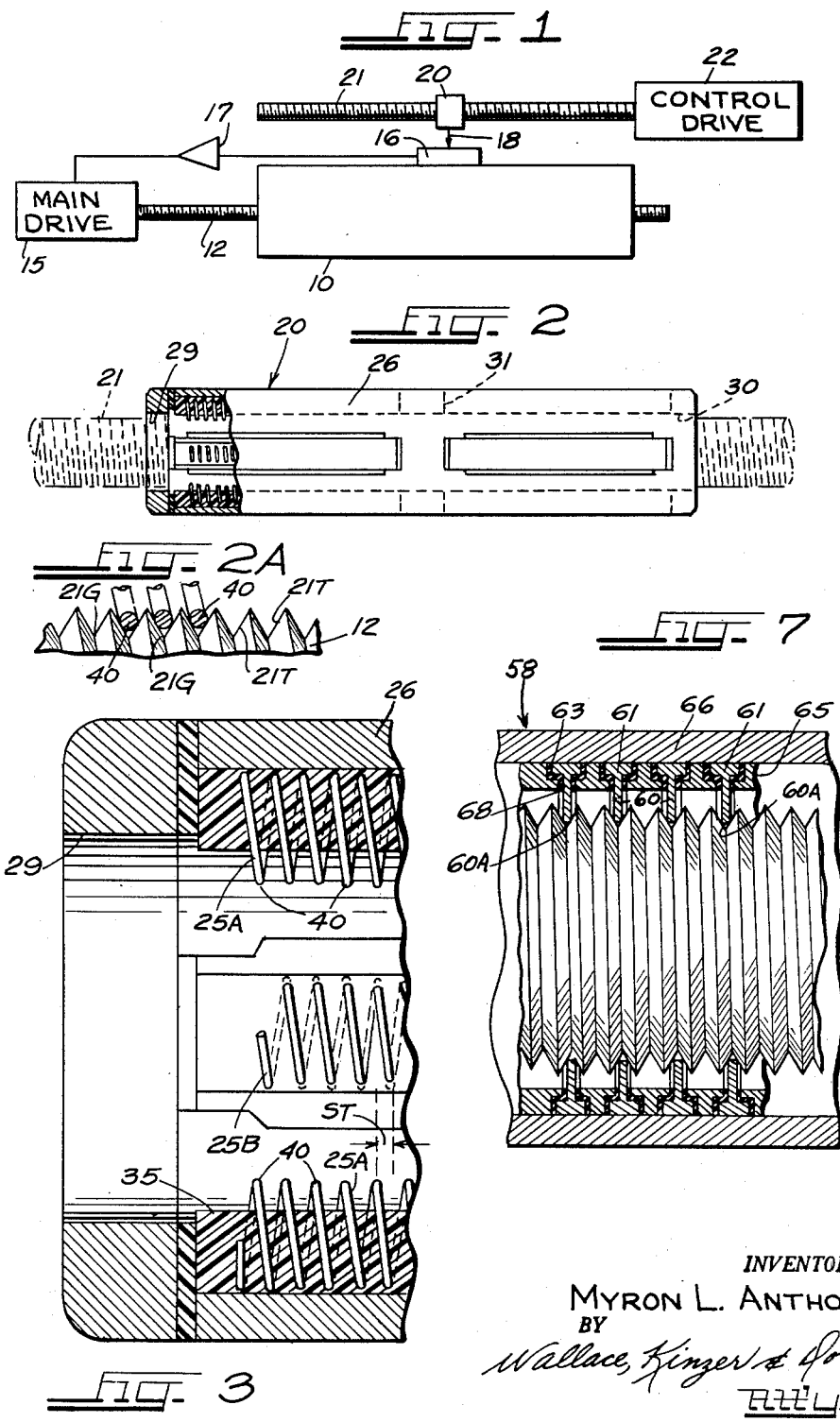
INVENTOR.
MYRON L. ANTHONY Feb. 18, 1964         M. L. ANTHONY         3,121,340
RESILIENT NUT FOR AVERAGING OUT LEAD SCREW ERROR
Filed Jan. 3, 1961         2 Sheets-Sheet 2
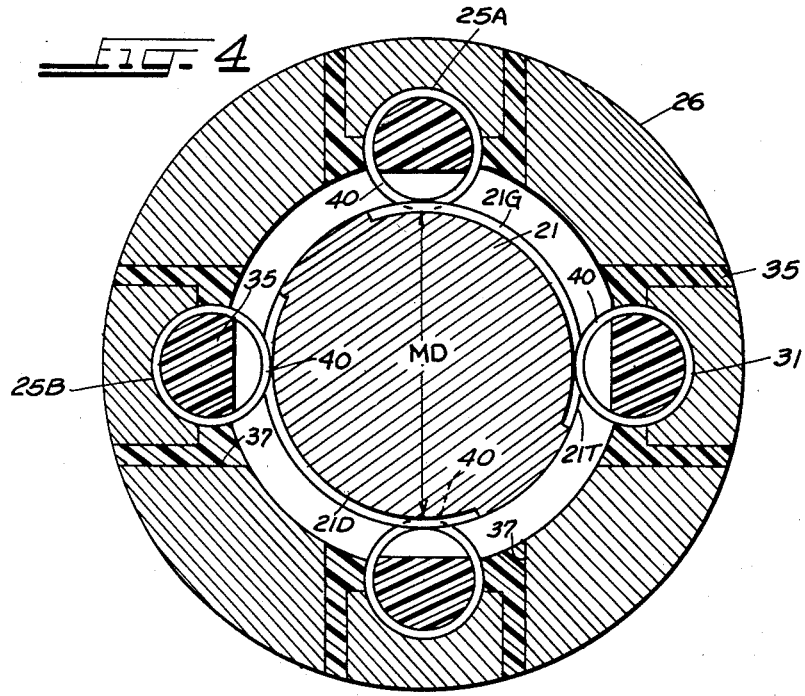
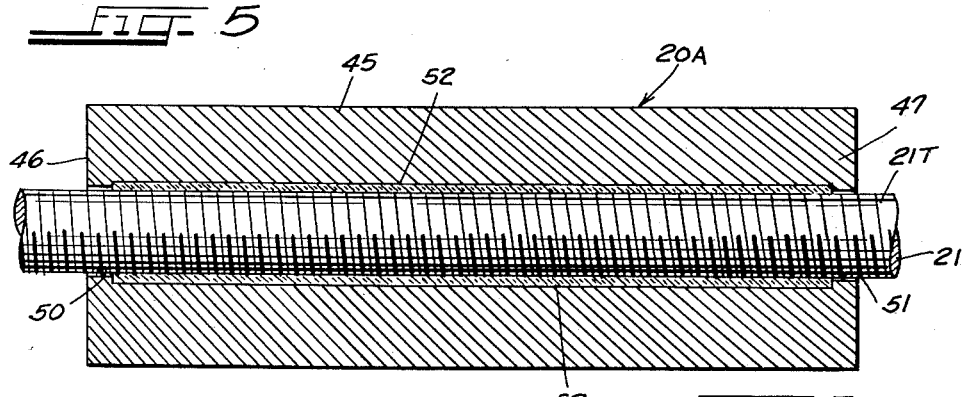
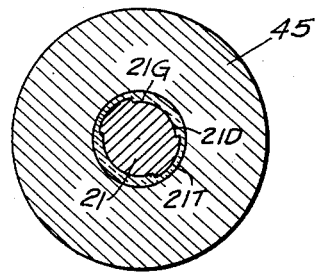
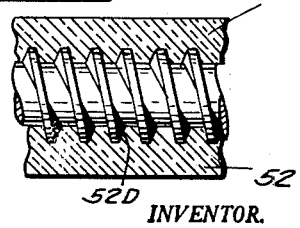
INVENTOR.
MYRON L. ANTHONY
BY
Wallace, Kinzer & Horn
ATTYS.

United States Patent Office 3,121,340
Patented Feb. 18, 1964

3,121,340
RESILIENT NUT FOR AVERAGING OUT LEAD SCREW ERROR
Myron L. Anthony, La Grange, Ill., assignor to Scully-Jones & Company, Chicago, Ill., a corporation of Illinois
Filed Jan. 3, 1961, Ser. No. 80,335
10 Claims. (Cl. 74—459)

This invention relates to machine tools and in particular to a novel form of lead screw follower or nut effective to average or cancel out errors necessarily incurred in machining the lead screw.

In those instances where the main drive for a workholder in a machine tool is made responsive to a control lead screw, lack of precision sometimes arises due to uncompensated errors in the pitch angle or other imperfection in the control lead screw which, as a practical matter, cannot be perfected insofar as machining of a lead screw is concerned. Another difficulty, and one that is perhaps of more critical importance is inherent backlash caused by the inability to attain absolute perfection between the threads of the control lead screw and the nut or follower, the positioning of which is used to generate a signal to the main drive referred to above. In this connection, it has been proposed to cancel backlash by having resort to a pair of anti-friction nuts of the ball coupling type preloaded against each other. Such an arrangement is, however, quite expensive, and there are practical limitations on the extent of the ball race such that in effect only a few averaging points or averaging out backlash can be achieved.

The primary object of the present invention is to average out lead screw error and backlash over a wide extent of the control lead screw in a machine tool or the like by way of a follower which is much less expensive in comparison to prior ball race proposals. Specifically, the object of the present invention is to accomplish this by a lead screw nut or follower in which conventional threads are supplanted by a multitude of resiliently disposed follower elements of a compliant nature such that each follower element will respectively bear against a circumferential portion only of the adjacent thread on the lead screw regardless of variations in pitch angle or thread contour over a wide extent of the control lead screw. In other words, each follower element itself possesses inherently a spring rate less than the screw thread, but in an over-all sense the follower is rigid or stable. Advantageously, the follower elements are afforded by free coil portions of a plurality of coil springs so disposed in a follower housing as to be symmetrically disposed about the circumference of the lead screw over a wide axial extent of the lead screw. The coil portions are, of course, fully compliant substantially in an axial direction and have low radial compliance. Hence the follower, in effect, is fully complemental to a multitude of threads of the lead screw regardless of lead screw error. Backlash in effect is completely eliminated, and short or periodic lead screw errors are averaged out to be virtually nil. In this connection it is also to be mentioned that the follower or nut is of such length that all the individual biases of the follower elements are averaged, and additionally the nut can have a total spring rate (essentially a rigid nut in totality) equal to or greater than the spring rate of the screw itself.

Compliancy of a follower can also be afforded by a bulk or felt body of resilient material such as woven fiber glass or the like which, when associated with the lead screw, will be deformed complemental to the lead screw contour, and being of fiber glass or the like the bulk body of resilient material will not take on a permanent set but rather, will conform to whatever portion of the lead screw is turning therein. Woven fiber glass or other such material will provide preferential compliance in the axial direction and low compliance in the radial direction. The bulk material should also have a low coefficient of thermal expansion. Glass fiber admirably meets this requirement, and steel wool is also a bulk material satisfying the foregoing requirements. Bulk or felt materials such as these afford smooth drive and low backlash characteristics for the follower.

Other and further objects of the present invention will be apparent form the following description and claims and are illustrated in the accompanying drawings which, by way of illustration, show preferred embodiments of the present invention and the principles thereof and what are now considered to be the best mode for applying these principles. Other embodiments of the invention embodying the same or equivalent principles may be made as desired by those skilled in the art without departing from the present invention and the purview of the appended claims.

In the drawings:

FIG. 1 is a diagrammatic drawing of an over-all machine tool system in accordance with the present invention;

FIG. 2 is a side elevation, on an enlarged scale, of the follower, diagrammatically depicted in FIG. 1;

FIG. 2A is a fragmentary view on an enlarged scale showing the nature of a complemental compliance between the follower and the lead screw under the present invention;

FIG. 3 is a fragmentary sectional view, on an enlarged scale, of a portion of the follower shown in FIG. 2;

FIG. 4 is a cross section view, on an enlarged scale, of the follower shown in FIG. 2;

FIG. 5 is a longitudinal sectional view of a modified form of a follower;

FIG. 5A is a detailed sectional view, on an enlarged scale, in comparison to FIG. 5, showing the relationship between the lead screw and the follower of FIG. 5;

FIG. 6 is a transverse sectional view of the arrangement shown in FIG. 5; and

FIG. 7 is a sectional view of another form of follower contemplated.

FIG. 1 is a diagrammatic view illustrating a typical machine tool construction wherein a work holder or tool table 10 is linearly positioned by a screw 12 that is turned by the main drive motor 15 of known construction. The motor 15 can be hydraulic and is part of a servo loop that includes the transducer 16 effective to generate a positioning signal to an amplifier 17 electrically coupled with the transducer, and as shown in FIG. 1, the amplifier is electrically coupled to the main drive motor 15 whereby the main drive motor is responsive to a positioning signal generated by the transducer 16.

The transducer 16 occupies a fixed position on the work holder or table and the signal generating element thereof is to generate a positioning signal when the transducer is misaligned with respect to an error detector 18 carried by a follower 20 so as to represent the datum point. The follower 20 in turn is associated with a control lead screw 21 so as to be positioned linearly when the lead screw 21 is turned by its associated control drive 22, the follower 20 being constrained for such movement in any suitable fashion.

Under the present invention, the follower 20 is of an elongated nature as shown in FIG. 2 so as to span a substantial portion of the length of the lead screw 21. The form of follower 20 illustrated in FIGS. 2 to 4 is one wherein a plurality of coil springs as 25A and 25B have coil portions thereof rigidly secured in the main housing or retainer 26 of the follower. Thus, the housing 26 can be of any preferred rigid material so formed as to surround the lead screw and having open ends 29 and 30 through which the control lead screw 21 is passed. In the form of the invention illustrated in FIGS. 2 to 4, the housing 26 is provided with elongated recesses 31, FIGS. 2 and 4, in the interior thereof, these recesses being so shaped as to enable somewhat more than half the diameter of the coil springs 25A and 25B to be seated and supported therein. The relationship is such that the inner loop portions of the coil springs are tangent to the circle having substantially a diameter corresponding to the root diameter of the lead screw as will be mentioned in more detail hereinafter.

Furthermore, as will be apparent from FIGS. 2 and 4, the coil springs are arranged in two series of four each, there being one series of four coil springs 25A and 25B seated in recesses in one half of the follower 20, and four like coil springs seated in recesses in the other half of the follower. Advantageously, the coil springs are arranged symmetrically about the circumference of the lead screw as will be evident in FIG. 4. In those instances where a lesser number of springs, say three, or a greater number, say five, are used, corresponding symmetry in the circumferential disposition of the springs about the screw will be utilized.

The portions of the coil springs that are seated in recesses as aforesaid are secured or retained therein and thereby fixed to the follower by flowing a thermosetting resin "solder" or equivalent adhesive material thereabout. Thus, as will be evident in FIG. 4, the coil springs are first disposed in their mounting sockets or recesses as 31, and thereafter a suitable resin 35, such as phenolformaldehyde, initially in a castable state, is afforded in an amount sufficient to fill the spaces between the coil spring loops that are disposed in the recesses 31 as well as immediate adjacent open areas 37 formed in the interior of the housing 26 so that the amount of locking resin is sufficient to anchor the embedded portions of the coil springs. Masks or suitable cores are used to so confine the resin 35 or equivalent anchoring material as to leave inner loop portions 40 of the coil springs free of the resin and in condition to contact the threads of the lead screw in a compliant relationship as will be explained in detail hereinafter.

Thus, the lead screw follower embodying coil springs under the present invention is so constructed that the radial outer loop portions of the coil springs are fixed to the follower housing while the radial inner loops as 40 of the coil springs represent a multitude of resilient follower elements that are freely exposed within the bore of the follower in position to engage portions of the sides of the lead screw threads 21T, FIGS. 2A and 4, at a multitude of points along the length of the lead screw. In other words, the dimensioning is such that the resilient follower elements 40 conform substantially to the minor or so-called root diameter MD, FIG. 4, of the lead screw, or in other words, the radial inner points of the follower elements 40 are radially inward of the major or outside thread diameter. Hence, when the lead screw is turned into the follower 20, the resilient follower elements are disposed in the thread grooves 21G, FIGS. 2A and 4 with preferably a tangential contact between the follower elements 40 and the root or minor circumference of the lead screw.

It will be appreciated that individual coils or helices of the springs are so spaced as normally to be separated a distance slightly less than the maximum width of the screw thread or multiple thereof so that the individual resilient follower elements, fully compliant to the lead screw, will be slightly sprung to produce effective contact with the thread sides along a substantial extent or length of the lead screw. The coil springs as 25A and 25B can be viewed as preferably representing a thread that is somewhat finer or closer than the thread on the lead screw and consequently the free coil portions of the springs as 25A and 25B will complementally seat in the thread grooves and bear against the sides of the threads as shown in FIG. 2A. This will be so for the full effective length of the follower (which is quite long as will be noted in FIG. 2) irrespective of variations in lead screw accuracy and irrespective of the particular portion of the lead screw that is coextensive with the follower 20. Resultantly, the biases of the coils are averaged out, lead screw error is averaged out, and in fact the follower can be of such length as to have a total spring rate equal to or greater than the lead screw.

As a further assurance to full averaging of lead screw variations and elimination of backlash, alternate coil springs as 25A and 25B, FIG. 3 are offset as indicated by the reference character ST. It will be recognized that the coil springs disclosed above represent an efficacious mode of achieving, in a relatively simple fashion, multitudinous contact between resilient or compliant follower elements and corresponding portions of the lead screw threads. Under some circumstances, less contact may be required for optimum error averaging, in which event the specific coil spring form can be varied.

FIGS. 5 to 6 are illustrative of the use of a substantially homogeneous, resilient felt body which is deformable by the lead screw, without partaking of a permanent set, to in effect produce in situ individual resilient follower elements. Thus, reference characters identical to those used above for parts of the lead screw are employed in FIGS. 5 and 6, but in this instance there is afforded a modified form of follower 20A which includes a sleeve-like housing or retainer 45 of substantial length. The retainer 45 includes end walls 46 and 47 formed with apertures 50 and 51 through which the lead screw 21 is adapted to pass freely and rotate with respect thereto. The interior of the housing 45 is of hollow form, of slightly larger diameter than the diameter of the lead screw, and bulk material 52 such as fiber glass, steel wool or the like is tightly packed therein incidental to initial assembly. Compaction of the resilient body 52 is effected so as to leave a smooth bore through the center portion thereof having a diameter so related to that of the lead screw 21 that the latter will in effect have a self-tapping action on the felt or bulk material when the follower 20A is run up on the lead screw. Thus, as shown in FIG. 5A, the felt body 52 will be deformed by the lead screw to become a fully complemental negative of the lead screw threads. In other words, the compliant follower elements in this instance are represented by projections 52D in the felt body 52 which extend fully complementally into the thread grooves of the lead screw, and since the felt or bulk material does not take on a permanent set, any particular follower element as 52D will comply with whatever portion of the lead screw is presented thereto, whether viewed as forward or reverse motion of the lead screw. Thus, the essential requirement is that the felt material or equivalent soft body be capable of compression or expansion as need be upon presentation of a different thread surface thereto.

A variation of the form of the invention contemplated in FIGS. 1 to 4 is shown in FIG. 7. In both instances the follower elements are resiliently mounted in the related housing to be axially compliant with respect to the lead screw, and the follower elements engage only a circumferential fraction of the opposed screw turn on the lead screw. Thus, as shown in FIG. 7 a follower 58 is inclusive of individual follower elements 60 of general T-shape which have the blade portions thereof formed with arcuate radial inner surfaces which are complemental to but merely a segment of a lead screw turn. As in the instance of the form of the invention shown in FIG. 3, there are several follower elements 60 for each lead screw turn or 360° thread element.

The follower elements 60 have cross heads 61 adapted to fit in retainer slots 63 of an inner retainer 65 disposed within an outer retainer or housing 66 which will correspond to the follower housing 26 described above. Thus, the two housing elements 65 and 66 are concentric, and the housing 65 will be rigidly related to the outer housing 66 as by a press fit or a set screw or the like after the follower elements have been operatively disposed in the retainer slots 63.

It will be noted that the retainer slots 63 are materially larger than the heads 61 of the follower elements and that the blades of the follower elements 60 extend through grooves 68 in the inner surface of the housing 65 to be engageable with the lead screw. The remaining space in each retainer slot 63 is packed with resilient material such as rubber or hydraulic fluid to enable an individual follower element to be displaced axially in the slot 63 and the related groove 68. This manifests the resilience or yield-ability of the follower elements 60 axially of the lead screw so as to be compliant thereto in cancelling or averaging the error of the lead screw.

It will be seen from the foregoing that under the present invention a lead screw follower is afforded having individual follower elements disposed in a housing or supporting member. The follower elements are flexible or compliant to whatever variation is encountered in the lead screw insofar as imperfection therein is concerned. In other words, the follower elements, and particularly the portions thereof that engage the threads of the screw, are articulated individually and independently of the adjacent thread engaging element or portion which is of the same nature. As a consequence, lead screw error is averaged over a vast extent of the lead screw, and backlash probability is virually nil, since the follower elements are free to shift axially of the retainer member as 26, 45 or 65.

Each follower element in the form of the invention shown in FIGS. 3 and 7 engages but a fraction of a lead screw turn, that is, substantially less than 360°. In other words, for a given number of thread turns on the lead screw embraced by the follower, the follower as 20 or 58 includes a number of lead screw thread-engaging follower elements that is a multiple thereof.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A follower for a lead screw or like threaded member, comprising: a retainer, and a plurality of coil springs each having portions of the coils thereof anchored to said retainer and remaining coil portions free of said retainer to be complianty forced into the grooves between the threads of said lead screw.

2. A follower according to claim 1 wherein the coils of adjacent springs are offset one with respect to the other.

3. A follower nut for a lead screw or like threaded member, comprising: a retainer having an axial bore, and a plurality of coil springs arranged within said retainer symmetrically about said bore and affording a multiplicity of individual resilient thread-engaging elements extending axially of said bore for compliantly engaging the threads of said lead screw, each of said thread-engaging elements being sized to engage only a fractional portion of a thread of the screw, and each of said thread-engaging elements that individually engages a thread of the screw being flexible and compliant to the shape of the screw thread entirely independently of the compliance of the axially adjacent thread-engaging element.

4. A follower nut for a lead screw or like threaded member, comprising: a retainer having an axial bore, and a bulk body of fibrous material, continuously compliant to variations in the pitch angle of the lead screw, supported by said retainer, said body affording a multiplicity of individual resilient thread-engaging elements extending axially of said bore for compliantly engaging the threads of said lead screw, and each of said thread-engaging elements that individually engages a thread of the screw being flexible and compliant to the shape of the screw thread entirely independently of the compliance of the axially adjacent thread-engaging element.

5. A follower nut for a lead screw or like threaded member, comprising: a retainer, and a homogeneous body of bulk fibrous material, continuously compliant to variations in the pitch angle of the lead screw, secured to said retainer and presenting portions conformable to the screw threads of the lead screw, said portions being disposed substantially symmetrically about the lead screw so that the lead screw is centered with respect thereto, and each of said portions compliantly engaging a predetermined extent of the opposed and related lead screw turn and being independently shiftable axially of the retainer and the lead screw, each of said portions being flexible and articulated independently of and irrespective of the adjacent thread-engaging portion which is of the same nature.

6. A follower nut for a lead screw or like threaded member, comprising: a retainer having an axial bore, and a plurality of individual thread-engaging elements each having an outer portion anchored to said retainer and each having an inner resilient portion free of the retainer and projecting into the bore thereof for compliantly engaging a multiplicity of threads of said lead screw and symmetrically about the circumference thereof, said inner resilient portions each being individually sprung and individually engageable with a thread of the screw so that each is individually compliant and articulated relative to the adjacent resilient portion whereby screw errors results in an accumulated bias to yield an average position for the follower nut during operation of the screw.

7. A follower nut for a lead screw or like threaded member, comprising: a retainer having an axially directed bore, and a multiplicity of individual resilient thread-engaging elements, each element having a portion anchored to said retainer in symmetrical circumferentially spaced relationship about and projecting into the bore thereof and each element having another portion free of the retainer for compliant engagement with the threads of said lead screw, each of said free portions of the thread-engaging elements being of a size of a size to engage only a fractional portion of a thread of the screw, and the free portions of said elements that compliantly engage the threads of the screw each being individually compliant independently of and irrespective of the immediately adjacent element.

8. A follower nut for a lead screw or like threaded member, comprising: a retainer having an axial bore, and means supported by said retainer and affording a multiplicity of individual resilient thread-engaging elements for compliantly engaging the threads of said lead screw, each of said elements having one portion anchored to said retainer and each of said elements having another portion free of the retainer and projecting into the bore, each of said other portions being sized to engage only a fractional portion of a thread of the screw, and each of said other portions of said thread engaging elements that individually engages a thread of the screw being flexible and compliant to the shape of the screw thread entirely independently of the compliance of the axially adjacent thread engaging element.

9. A follower nut for a lead screw or like threaded member, comprising: a retainer having a bore and thread-engaging elements secured to said retainer, each of said elements presenting a radial outer portion anchored to said retainer and each of said elements presenting a radial inner portion which is a continuation of the first-named portion but which is free of the retainer and projects into the bore thereof to be conformable to the screw threads of the lead screw, said elements being disposed substantially symmetrically about the lead screw so that the lead screw is centered with respect thereto, each of said radial inner portions being compliantly engageable with a predetermined extent of the opposed and related lead screw turn and being independently shiftable axially of the retainer and the lead screw, and each of said inner portions being flexible and articulated independently of and irrespective of the thread-engaging portion of the adjacent element which is of the same nature.

10. A follower according to claim 9 wherein said means comprise a plurality of coil springs with radial inner portions of the coils thereof engaging the screw threads and radial outer portions thereof anchored to said retainer.

References Cited in the file of this patent
UNITED STATES PATENTS

| | | |
|---|---|---|
| 1,720,648 | Hallett | July 9, 1929 |
| 1,828,272 | Ashbaugh et al. | Oct. 20, 1931 |
| 2,659,241 | Holman | Nov. 17, 1953 |
| 2,780,265 | Brancato | Feb. 5, 1957 |
| 2,818,745 | Spontelli | Jan. 7, 1958 |
| 2,831,363 | Lohr | Apr. 22, 1958 |
| 2,831,459 | Smith | Apr. 22, 1958 |
| 2,837,706 | Glassey | June 3, 1958 |
| 2,861,234 | Martin et al. | Nov. 18, 1958 |
| 2,936,646 | Gould | May 17, 1960 |

FOREIGN PATENTS

| | | |
|---|---|---|
| 1,181,482 | France | Jan. 12, 1959 |

OTHER REFERENCES

Publication: Machine Design; Fabricating Nylon Parts, March 1954; pages 153–159 (note FIG. 11).